United States Patent
Lynch et al.

(10) Patent No.: US 11,656,766 B2
(45) Date of Patent: May 23, 2023

(54) CORRELATING TIME ON STORAGE NETWORK COMPONENTS

(71) Applicant: EMC IP Holding Company LLC, Hopkinton, MA (US)

(72) Inventors: John R. Lynch, Pasadena, MD (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 33 days.

(21) Appl. No.: 17/222,350

(22) Filed: Apr. 5, 2021

(65) Prior Publication Data
US 2022/0317892 A1 Oct. 6, 2022

(51) Int. Cl.
*G06F 3/06* (2006.01)

(52) U.S. Cl.
CPC .......... *G06F 3/0617* (2013.01); *G06F 3/0605* (2013.01); *G06F 3/067* (2013.01); *G06F 3/0635* (2013.01); *G06F 3/0659* (2013.01)

(58) Field of Classification Search
CPC .... G06F 3/0617; G06F 3/0605; G06F 3/0635; G06F 3/0659; G06F 3/067; H04W 4/025; G06Q 10/109
See application file for complete search history.

(56) References Cited

U.S. PATENT DOCUMENTS

2015/0146713 A1* 5/2015 Yang ................. H04W 56/0015
370/350

* cited by examiner

*Primary Examiner* — Ernest Unelus
(74) *Attorney, Agent, or Firm* — Muirhead and Saturnelli, LLC

(57) ABSTRACT

A temporal correlation may be determined between times specified according to different time standards on different storage network components. A host system may poll a storage system periodically. In response to each poll request, the storage system may respond with the current time on the storage system (CST) according to the time standard of the storage system. The host system may store temporal correlation information (TCI) associating the CST and the current time on the host system (CHT) according to the time standard of the host system. A data structure (TCT) may be provided, where each entry may specify TCI for a CST/CHT pair, the TCI including the CST, CHT and other information corresponding to the temporal correlation between the pair. The TCI may be used to correlate the time of a phenomenon according to the host system time standard to a time according to the storage system time standard.

18 Claims, 7 Drawing Sheets

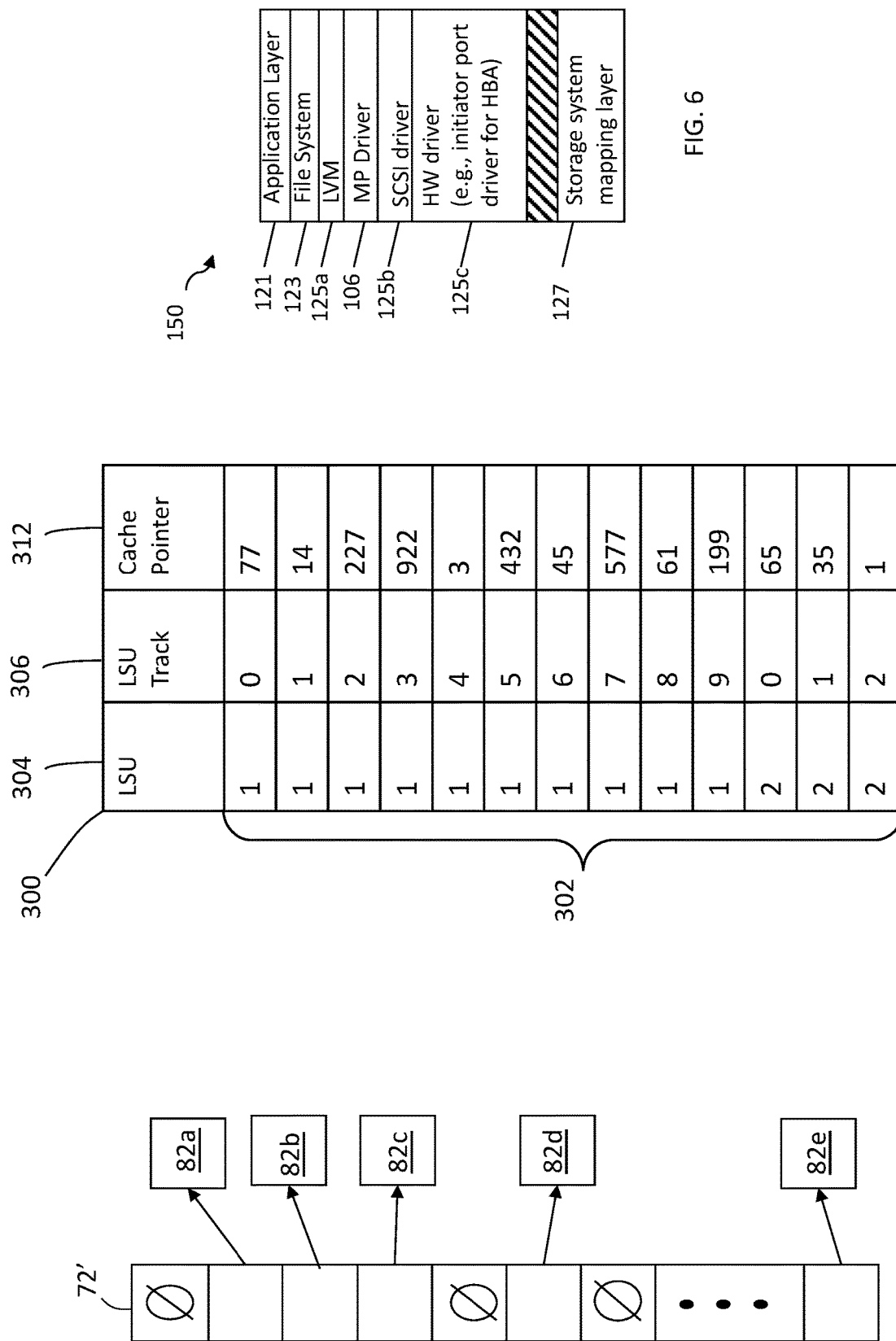

CORRELATING TIME ON STORAGE NETWORK COMPONENTS

BACKGROUND

Technical Field

This application generally relates to data storage networks, and more particularly to correlating time between multiple components of a data storage.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (I/O) operations utilizing a physical storage device of the storage system, one or more components of the host system, storage system and network components therebetween may be used. The one or more combinations of components of the host, switching fabric and storage system over which I/O operations between an application and storage device may be communicated may be considered an I/O path between the application and the storage device. It should be appreciated that other combinations of components of a storage network, for example, two or more storage systems, also may be coupled together by one or more switches of a switching fabric. Thus, more generically, the one or more combinations of components of a first network component, switching fabric and second network component over which I/O communications may be communicated may be considered an I/O path between the two network components. The collective I/O paths between components of a storage network may be considered to define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In an embodiment of the invention, a method for a storage network including a first component and a second component is performed. The method includes: sending a request from the second component to the first component to provide a current time on the first component; receiving a response to the request, the response specifying a first time when the response was sent according to a time standard of the first component; determining a second time when the response was received according to a time standard of the second component; storing first information associating the first time and the second time on the second component; and, for a phenomenon involving the first component, determining, based on the first information, a third time that the phenomenon occurred according to at least one of the first time standard and the second time standard. The first information may be stored in a directory on the second component on which phenomena that occur on the storage network, including the phenomenon, are logged. The method may include generating the first information between the first time and the second time, wherein the first information includes information about the first time standard and the second time standard. The first time standard may be for a first time zone, and the second time standard may be for a second time zone, and the first information may include information about the first time zone and the second time zone. The first time standard may have a first format, and the second time standard may have a second format, the method further may include generating the first information, including performing at least one of: converting the first time to another format, and converting the second time to another format. Sending the request, receiving the response specifying the first time, determining the second time, and storing the first information may be repeated a plurality of times over a period of time to produce as plurality of information elements over the period of time, including the first information, and the plurality of information elements may be stored in a data structure including a plurality of entries, each entry specifying one of the plurality of information elements. The first entry of the data structure may specify the first information, and the method further may include: receiving an indication of a fourth time of the phenomenon according to at least one of the first time standard and the second time standard; determining that the first entry represents a time closest to the fourth time from among the plurality of entries of the data structure; and determining the third time of the phenomenon based on the first information specified by the first entry. The first component may be a storage system and the second component may be a host system.

In another embodiment of the invention, a system including executable logic may be provided for a storage network including a first component and a second component. The executable logic implements a method including: sending a request from the second component to the first component to provide a current time on the first component; receiving a response to the request, the response specifying a first time when the response was sent according to a time standard of the first component; determining a second time when the response was received according to a time standard of the second component; storing a first association between the first time and the second time on the second component; and, for a phenomenon corresponding to the first component, determining a third time of the phenomenon according to at least one of the first time standard and the second time standard based on the first association between the first time and the second time. The first information may be stored in a directory on the second component on which phenomena that occur on the storage network, including the phenomenon, are logged. The method further may include generating the first information between the first time and the second time, and the first information may include information about the first time standard and the second time standard. The first time standard may be for a first time zone, and the second time standard may be for a second time zone, and the first information may include information about the first time zone and the second time zone. Sending the request, receiving the response specifying the first time, determining the second time, and storing the first information may be repeated a plurality of times over a period of time to produce as plurality of information elements over the period of time, including the first information, and the plurality of information elements may be stored in a data structure including a plurality of entries, each entry specifying one of the plurality of information elements. A first entry of the data structure may specify the first information, and the method further may include: receiving an indication of a fourth time of the phenomenon according to at least one of the first time standard and the second time standard; determining that the first entry represents a time closest to the fourth time from among the plurality of entries of the data structure; and determining the third time of the phenomenon based on the first information specified by the first entry.

In another embodiment, computer-readable media having software stored thereon is provided for a storage network including a first component and a second component. The computer-readable media has software stored thereon including: executable code that controls sending a request from the second component to the first component to provide a current time on the first component; executable code that controls receiving a response to the request, the response specifying a first time when the response was sent according to a time standard of the first component; executable code that controls determining a second time when the response was received according to a time standard of the second component; executable code that controls storing a first association between the first time and the second time on the second component; and executable code that, for a phenomenon corresponding to the first component, controls determining a third time of the phenomenon according to at least one of the first time standard and the second time standard based on the first association between the first time and the second time. The first information may be stored in a directory on the second component on which phenomena that occur on the storage network, including the phenomenon, are logged. The computer-readable media further may include executable code that controls generating the first information between the first time and the second time, wherein the first information may include information about the first time standard and the second time standard. The first time standard may be for a first time zone, and the second time standard may be for a second time zone, and the first information may include information about the first time zone and the second time zone. Sending the request, receiving the response specifying the first time, determining the second time, and storing the first information may be repeated a plurality of times over a period of time to produce as plurality of information elements over the period of time, including the first information, and the plurality of information elements may be stored in a data structure including a plurality of entries, each entry specifying one of the plurality of information elements. A first entry of the data structure specifies the first information, and the method further may include: executable code that controls receiving an indication of a fourth time of the phenomenon according to at least one of the first time standard and the second time standard; executable code that controls determining that the first entry represents a time closest to the fourth time from among the plurality of entries of the data structure; and executable code that controls determining the third time of the phenomenon based on the first information specified by the first entry.

BRIEF DESCRIPTION OF THE DRAWINGS

Features and advantages of the present invention will become more apparent from the following detailed description of illustrative embodiments thereof taken in conjunction with the accompanying drawings in which:

FIG. 3B a block diagram illustrating an example of a table used for a thin logical device, according to embodiments of the invention;

FIG. 4 is a block diagram illustrating an example of a data structure for mapping logical storage unit tracks to cache slots, according to embodiments of the invention;

FIG. 6 is a block diagram illustrating an example of a plurality of logical layers of a combination of a host system and a data storage system for processing an I/O request, according to embodiments of the invention;

DETAILED DESCRIPTION OF EMBODIMENTS

Figure 1:
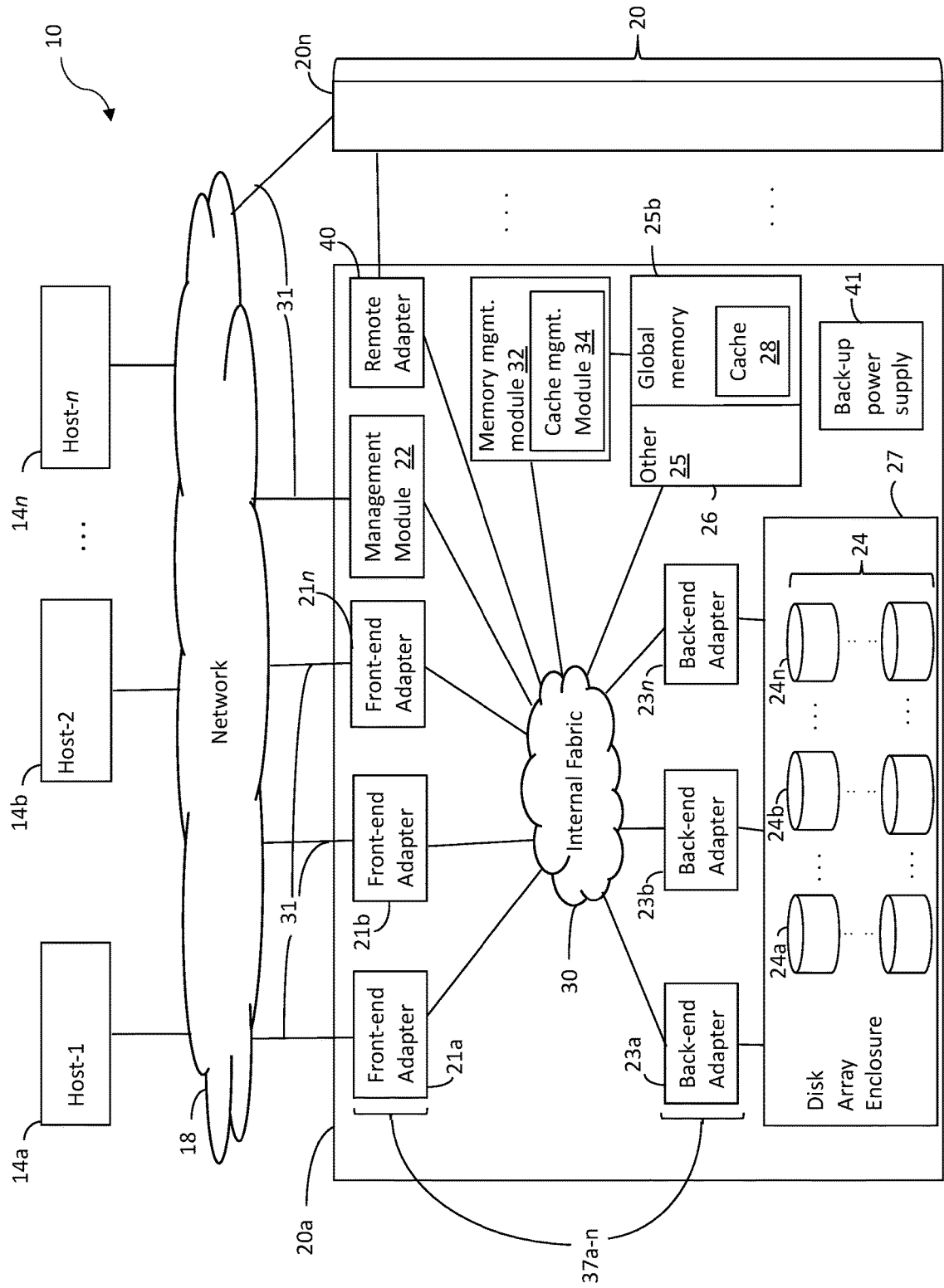
FIG. 1 is a block diagram illustrating an example of a data storage network, according to embodiments of the invention.

On some storage networks today, when trying to investigate a performance issue, one of the main difficulties is correlating the time between two or more components associated with the performance issue, for example, between two or more of any of: host systems (i.e., servers), storage systems, switches; other storage network components; and/or any applications executing on one or more of the foregoing. For example, when investigating a performance incident for an Oracle application (e.g., executing on one or more hosts of a host cluster), there may be a need to correlate the time of events reported in: the Oracle logs; one or more host logs (e.g., in the "/var/log/messages" directory) on various hosts; and one or more storage system (e.g., array) logs, for example, when using remote replication (e.g., an Active-Active configuration). In some cases, a host system may be located at a different geographical location—perhaps in a different time zone—than other host systems of a cluster and/or one or more the storage systems to which data is being stored or replicated. Further, each host system and/or storage system may be different from each other—including different vendors, models and/or configurations thereof, and the instances of the applications running on one more of these network components may be different versions and may be configured differently.

As a result of the foregoing, an error involving multiple network components may be reported using different time standards, where each time standard may include a specific format, temporal granularity (e.g., nanoseconds, microseconds, milliseconds), time zone and other time parameter values. For example, a storage network may include a storage system located in England and made available from a first vendor, and a host system located in Germany and made available from a second vendor. The storage system may record phenomena (e.g., events, incidents, performance information, combinations thereof, etc.), including errors, according to a first time standard that: counts time at a first granularity (e.g., tens of microseconds), specifies an internal representation of the time in a first proprietary format of the first vendor, and specifies an external (e.g., user) representation of the time in English in month-day-year form and in Greenwich Mean Time (GMT); whereas the host system may record phenomena according to a second time standard that: counts time at a second granularity (e.g., milliseconds), specifies an internal representation of the time in a second proprietary format of the second vendor, and specifies an external representation of the time in German in year-month-day form and for Central European Standard Time (CET, i.e., GMT+1).

As a result of different storage network components using different time standards, troubleshooting an issue involving the different components may involve much manual effort by one or more persons. For example, a host IT administrator interrogating a performance issue involving a host and storage system may review data and reports based on the time standard of the host system. To consider corresponding data from the storage system, the host IT administrator must first determine the time or time period on the storage system that correlates to (e.g., matches) the time or time period on the host system under consideration. The host IT administrator may need to convey this information to another person (e.g., a storage system administrator) to access data from the corresponding time on the storage system, or use such information herself to access the data on the storage system. The host administrator and/or storage administrator may need to convert the internal or external representations of the data from the storage system to formats consistent with those on the host system, and may need to correlate more granular or less granular times on the storage system to the less granular or more granular times, respectively, on the host system.

Such manual effort not only consumes time—perhaps under urgent circumstances—but also is subject to human error. These potential shortcomings are only amplified as the number of network components on a storage network increases, both in the number of potentially difference time standards to handle generally, and more specifically in the number of potentially difference time standards to handle in connection with a same phenomenon, i.e., as the number of network components investigated in relation to the phenomenon increases.

What may be desirable is a more efficient way to temporally correlate data in different time standards from different storage network components, for example, in relation to investigating a phenomenon on the storage network.

Described herein are mechanisms and techniques for temporally correlating data specified in different time standards from different storage network components, for example, in relation to investigating a phenomenon on the storage network. Embodiments of the invention will now be described, often in relation to a single host system and a single storage system of a storage network. However, it should be appreciated that the invention is not limited to a single host system and a single storage system, but is applicable to multiple host systems, multiple storage systems or a combination thereof. Furthermore, the mechanisms and techniques described herein are not limited to host systems and storage systems, but may apply to any two or more components of a storage network or another type of network or system.

In some embodiments of the invention, a host system polls a storage system, for example, periodically according to a predefined schedule. In response to each poll request received from the host system, the storage system may respond with the current time on the storage system according to the time standard of the storage system. It should be appreciated that the current time on the storage system corresponds to the time at which the storage system sends the response to the polling request, and may be referred to herein as the current storage system time or CST. The host system may store temporal correlation information (TCI) associating the CST with the current time on the host system according to the time standard of the host system. It should be appreciated that the current time on the host system corresponds to the time at which the host system receives the response to the polling request, and may be referred to herein as the current host system time or CHT. A CST of the storage system and its corresponding CHT on the host system may be referred to herein as a CST/CHT pair.

The host system may store the TCI in a "/var/log/messages" directory or another directory in which information is stored, for example, a same directory in which information concerning phenomena (e.g., events and/or performance information)—to which the TCI may be applied—are stored.

In some embodiments, one or more data structures may be provided, where each data structure includes a plurality of entries. Each entry may specify TCI for a CST/CHT pair. Each entry may include only the CST and CHT themselves, for example, in their native internal formats, and also may include other information corresponding to the temporal correlation between the CST and CHT, as described in more detail herein. Such one or more data structures may be referred to herein as time correlation tables or TCTs.

In some embodiments, a CST and/or CHT may be converted to another time standard, for example, the time standards of the CHT or CST, respectively, or to another time standard that may be used as a common time standard. Converting from one time standard to another may include converting any one or more of: time granularity; internal representation format; external (e.g., user) representation format, including time zone; and other time parameter values. The converted CST and/or CHT may be stored along with the CST and CHT as part of the TCI in a TCT entry for the CST/CHT pair.

The frequency with which a host system polls a storage system for time information may be configured to strike a desired balance between temporal precision and resource consumption. That is, a greater frequency enables a more precise matching between a time corresponding to a phenomenon (as described in more detail herein) and a time corresponding to a CST/CHT pair, but consumes more memory (volatile and/or non-volatile), network resources and computational resources.

In response to determining a time on a host system corresponding to a phenomenon (e.g., performance issue or application error), it may be determined which entry in a TCT has a CHT closest in time to the determined time. In some cases, the CHT of the determined entry may be the identical time as the determined time. The determined entry may be accessed to ascertain the CST of the CST/CHT pair, or information corresponding to the CST, where such CST should be a closest CST of the CSTs in the TCT to the determined time corresponding to the phenomenon. The TCI in the TCT entry corresponding to the CST may be the converted CST produced by converting the CST to the time standard of the host system, as described in more details elsewhere herein, and other information related to the converted CST.

The CST and/or information corresponding to the CST from the determined entry may be displayed to a user or otherwise conveyed to one or more users or other entities to express the time on the storage system corresponding to the time of the phenomenon. For example, the CST information may be displayed in a human-readable form in accordance with the storage system time standard.

In some embodiments, rather than converting CSTs to a time standard of a host system and storing the converted CSTs in TCT entries, a function for converting a CST to the host time standard may be recorded, and this function may be applied to each CST to produce the converted CST when desired. It should be appreciated that the converting function may be the same for all CST/CHT pairs of a storage system-host system combination.

It should be appreciated that a separate TCT may be provided for each combination of network components (e.g., host systems, storage systems, switches) on a storage network, in which each entry may be keyed by a CST or CHT. In some embodiments, one or more TCTs may combine information of network component combinations, in which case each entry may include one or more fields for specifying the network components to which the entry applies, and each entry may be keyed by a combination of a network component ID and a CST or CHT. It should be appreciated that a variety of indexes may be created for combinations of network components to facilitate determining corresponding times between time standards.

In some embodiments, rather than determining (e.g., by polling) and storing information associating a CST with a CHT (e.g., in a TCT), a conversion function for converting a CHT to a CST may be determined and stored for a storage system-host system combination. In such embodiments, rather than determining and accessing a TCT entry specifying a CHT closest in time to a time corresponding to a phenomenon to determine a time on the storage system corresponding to a time of a phenomenon on the host system, such time may be determined by applying the conversion function to the host phenomenon time. The CST information then may be displayed or otherwise conveyed in a human-readable form in accordance with the storage system time standard. Conversely, a conversion function for converting a CST to a CHT may be determined and applied in a reciprocal manner. In such embodiments, a data structure may be provided including a plurality of entries, where each entry specifies a conversion function from one particular network component to another particular network component. Such a data structure may be referred to herein as a time conversion table or TCT. In such embodiments, the conversion function(s) may be tested from time to time to confirm accuracy and correct accuracy as necessary.

In some embodiments, the techniques and/or mechanisms described herein are implemented by a multi-path (MP) driver of a host system, for example, an MP driver as described in more detail elsewhere herein.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a switching fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and inter-connected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more front-end adapters ("FAs") 21a-n (e.g., directors configured to serve as FAs), which also are referred to herein as host adapters ("Hs"). Each of these FAs may be used to manage communications and data operations between one or more host systems and global memory (GM) 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing I/O operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which for which data stored thereon persists after the process or program that created the data terminates. For example, at least portions of the memory 26 may be implemented using one or more dual in-line memory modules (DIMMs) or another type of fast RAM memory, which may be battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
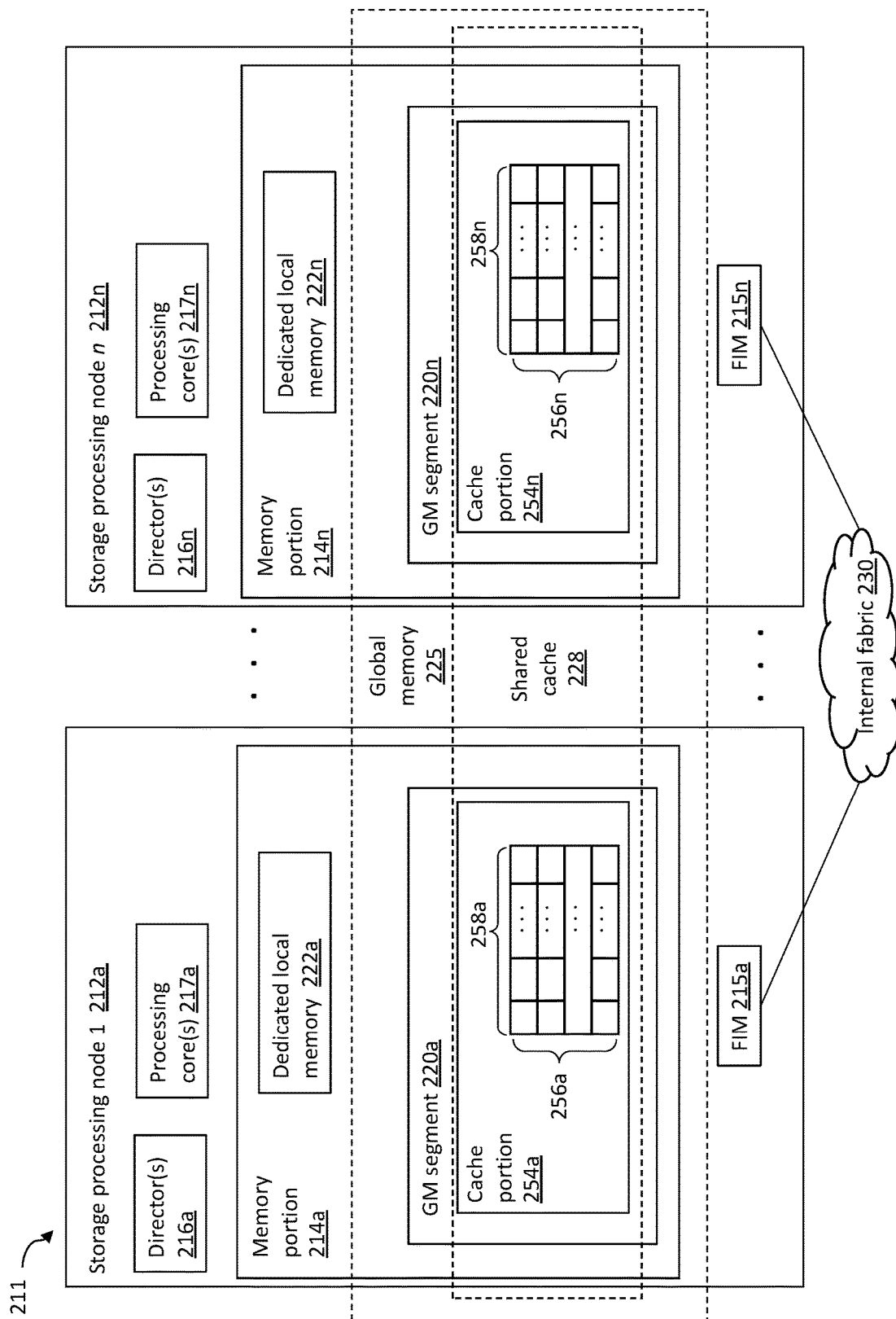
FIG. 2 is a block diagram illustrating an example of a storage system including multiple physically discrete storage processing nodes, according to embodiments of the invention.

Any of storage systems 20a-n, or one or more components thereof, described in relation to FIGS. 1-2 may be implemented using one or more Symmetrix™, VMAX™, VMAX3™ or PowerMax™ systems made available from Dell EMC.

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "processing nodes." Storage system 211 may include a plurality of processing nodes 212a-212n and a fabric 230 (e.g., internal fabric 30) over which the processing nodes 212a-n may communicate. Each of the processing nodes 212a-212n may include components thereon as illustrated. The switching fabric 230 may include, for example, one or more switches and connections between the switch(es) and processing nodes 212a-212n. In at least one embodiment, the fabric 230 may be an D3 fabric. In some embodiments, multiple processing 212a-n nodes may be implemented on a single physically discrete component; e.g., two processing nodes 212a-n may be implemented on single engine of PowerMax storage system.

In the following paragraphs, further details are described with reference to processing node 212a but each of the N processing nodes in a system may be similarly configured. For example, processing node 212a may include any of: one or more directors 216a (e.g., directors 37a-n); memory portion 214a; one or more processing cores 217a including compute resources, for example, as part of a CPUs and/or a CPU complex for processing I/O operations; and a fabric interface module (FIM) 215a for interfacing the processing node 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective processing node 212a-n, and the internal fabric 230. In some embodiments, the internal fabric 230 may include multiple (e.g., 2) switches, and each HCA 215a-n may have multiple (e.g., 2) ports, each one connected directly to one of the switches.

Each of the processing nodes 212a-n may, respectively, also include memory portions 214a-n. The memory portion of each processing node may be characterized as locally accessible with respect to that particular processing node, and more specifically with respect to other components on the same processing node. For example, processing node 212a includes memory portion 214a which is memory that is local to that particular processing node 212a. Data stored in memory portion 214a may be directly accessed by any of the processing cores 217a (e.g., executing instructions on behalf of one of the directors 216a) of the processing node 212a. For example, memory portion 214a may be a fast memory (e.g., DIMM DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of processing nodes 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any processing node 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single processing node. In at least one embodiment where there is a single director denoted by 216a (and generally by each of 216a-n), data stored in the dedicated local memory 222a may be accessed by the respective single director 216a located on the same processing node 212a. However, the remaining directors located on other ones of the N processing nodes may not access data stored in the dedicated local memory 222a.

To further illustrate, GM segment 220a may include information such as user data stored in the cache portion 220a, metadata, and the like, that is accessed (e.g., for read and/or write) generally by any director of any of the processing nodes 212a-n. Thus, for example, any director 216a-n of any of the processing nodes 212a-n may communicate over the fabric 230 to access data in GM segment 220a. In a similar manner, any director 216a-n of any of the processing nodes 212a-n may generally communicate over fabric 230 to access any GM segment 220a-n of the distributed GM. Although a particular GM segment, such as 220a, may be locally accessible to directors on one particular processing node, such as 212a, any director of any of the processing nodes 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on processing node 212a configured for local use solely by components on the single/same processing node 212a. For example, dedicated local memory 222a may include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the processing nodes 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store I/O data (e.g., for servicing read and write operations).

Each cache portion 254a-n may be a portion of a shared cache 228 (e.g., cache 28) distributed across the processing nodes 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process I/O on storage system 20a, including data structures to manage the mapping of LSUs and locations thereon to physical storage devices and locations thereon. Such data structures may be stored in any of memory 26, including GM 25b and memory 25a, GM segment 220a-n and/or dedicated local memories 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3A:
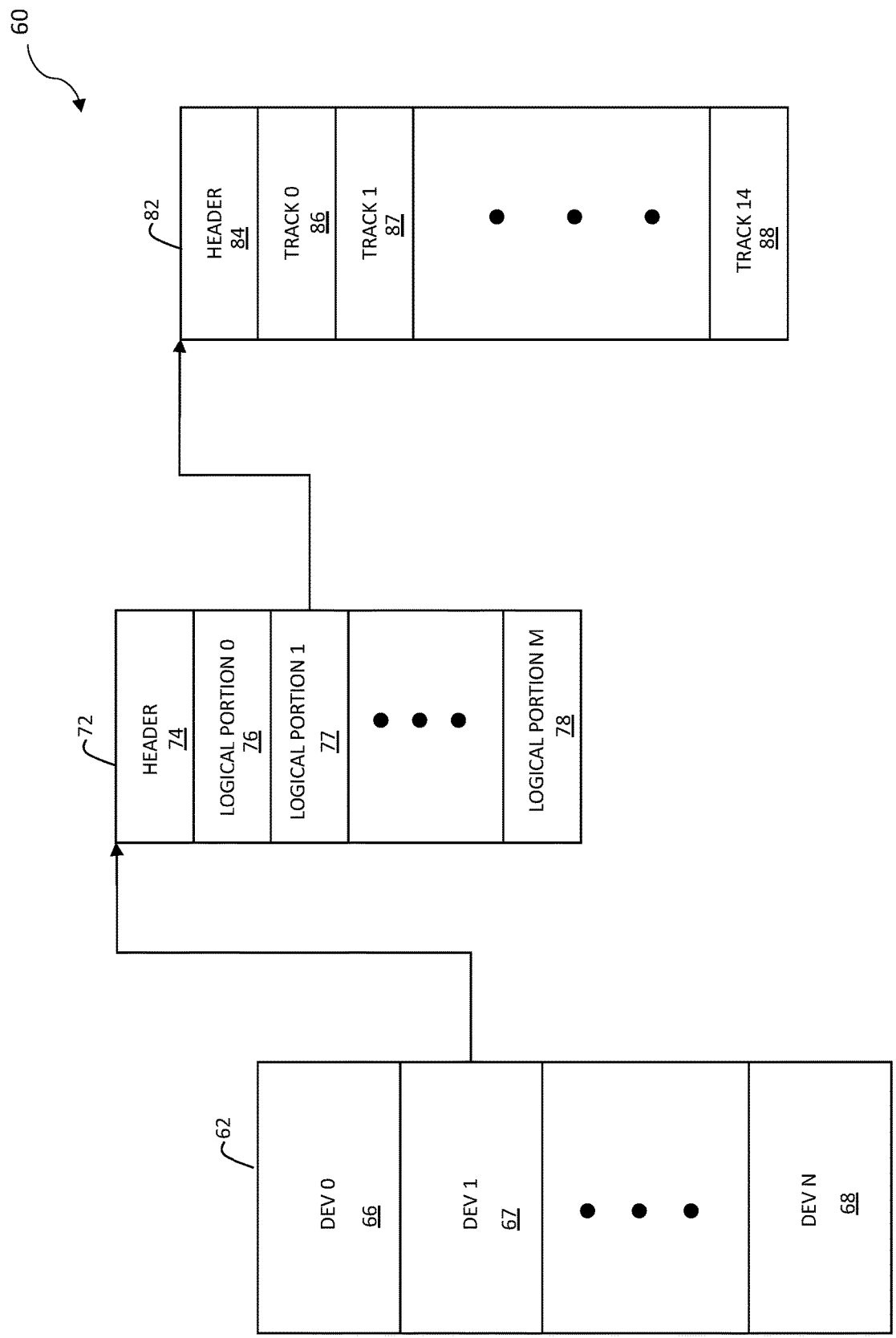
FIG. 3A is a block diagram illustrating an example of tables defining relationships between logical storage units and physical storage devices on a data storage system, according to embodiments of the invention.

FIG. 3A is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. As used herein, a "track" or "LSU track" represents a contiguous segment of physical storage space on a physical storage device. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20a (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 300, described in more detail elsewhere herein. Thus, the LSU track table 82 may be used to map logical addresses of an LSU corresponding to the tables 62, 72, 82 to physical addresses within physical storage devices of a storage system and/or to cache slots within a cache.

In some embodiments, each entry 86-88 may specify a version of the data stored on the track, as described in more detail elsewhere herein. A sub-element of an LSU, for example, a logical storage portion or track, may be referred to herein as a logical storage element (LSE).

FIG. 3B is a diagram illustrating an example of a table 72' used for a thin logical device (i.e., a thin LSU), which may include null pointers as well as entries similar to entries for the LSU table 72, discussed above, that point to a plurality of LSU track tables 82a-82e. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

FIG. 4 is a block diagram illustrating an example of a data structure 300 for mapping LSU tracks (e.g., thin device tracks) to cache slots of a cache. Data structure 300 may be referred to herein as a "cache slot table." Cache slot table 300 may include a plurality of entries (i.e., rows) 302, each row representing an LSU track (e.g., any of LSU tracks 86-88 in track table 82) identified by an LSU ID in column 304 and an LSU track ID (e.g., number) identified in column 306. For each entry of cache slot table 300, column 312 may specify a cache location in a cache corresponding to the logical storage device track specified by columns 304 and 306. A combination of an LSU identifier and LSU track identifier may be used to determine from columns 304 and 306 whether the data of the identified LSU track currently resides in any cache slot identified in column 312. Through use of information from any of tables 62, 72, 72' and 82 described in more detail elsewhere herein, the one or more LSU tracks of an LSU specified in an I/O operation can be mapped to one or more cache slots. Further, using the same data structures, the one or more physical address ranges corresponding to the one or more LSU tracks of the LSU may be mapped to one or more cache slots.

The tables 62, 72, 72', 82 and 300 may be stored in the GM 26 of the storage system 20a during operation thereof and may otherwise be stored in non-volatile memory (i.e., with the corresponding physical storage device). In addition, tables corresponding to LSUs accessed by a particular host may be stored in local memory of the corresponding one of the FAs 21*a*-*n*. In addition, RA 40 and/or the BEs 23*a*-*n* may also use and locally store portions of the tables 62, 72, 72', 82 and 300. Other data structures may be stored in any of GM 25*b*, memory 25*a*, GM segment 220*a*-*n* and/or dedicated local memories 22*a*-*n*.

Figure 5:
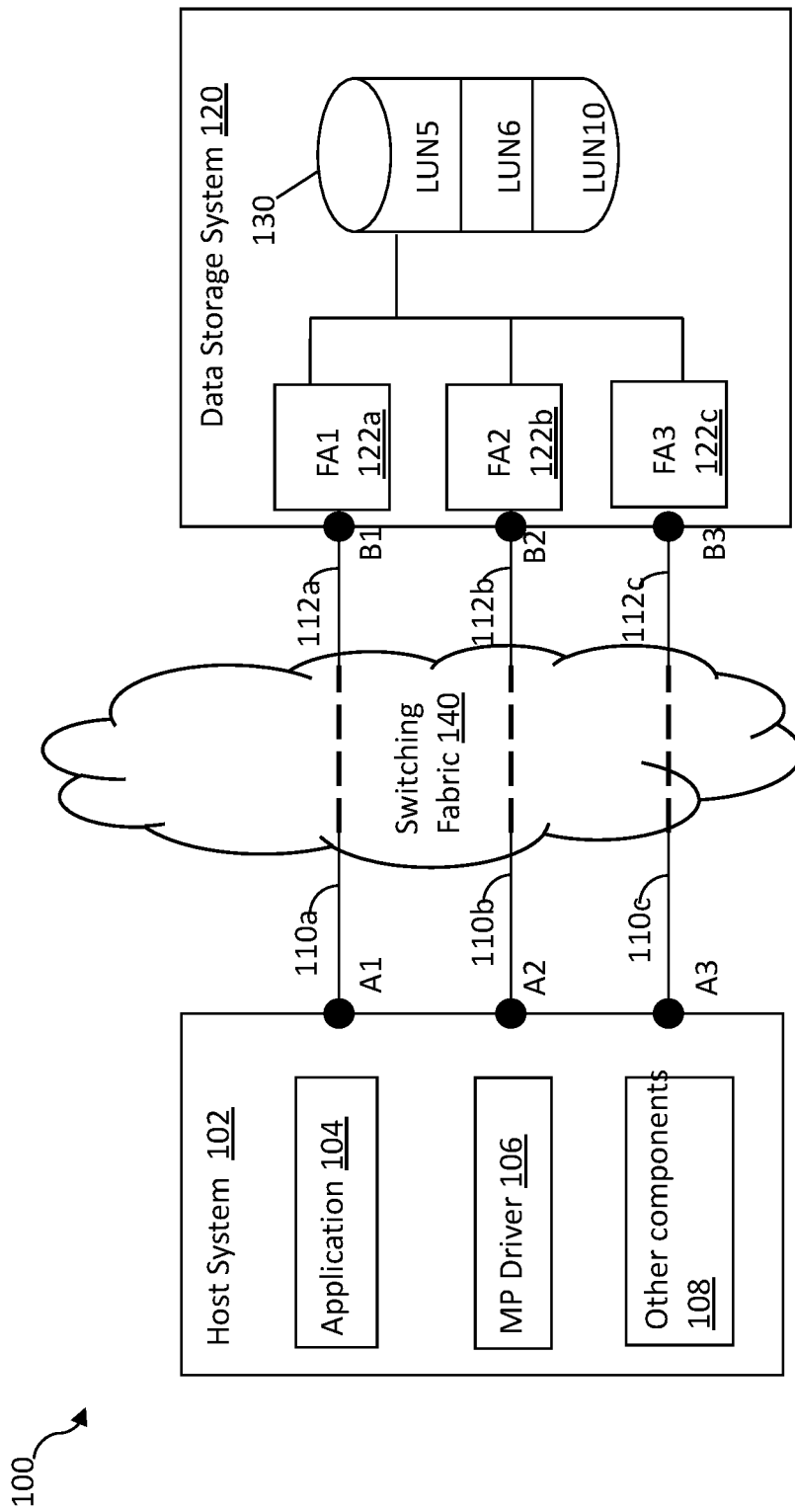
FIG. 5 is a block diagram illustrating an example of a system including a host system communicatively coupled to a data storage system via multiple I/O paths, according to embodiments of the invention.

FIG. 5 is a block diagram illustrating an example of a system 100 including a host system 102 communicatively coupled to a data storage system 120 via multiple I/O paths, according to embodiments of the invention. Other embodiments of system including a host system communicatively coupled to a data storage system via multiple I/O paths, for example, variations of system 100, are possible and are intended to fall within the scope of the invention. The system 100 may be implemented using one or more components of the system 10, for example, one or more storage systems 20*a*-*n* and/or one or more hosts 14*a*-14*n*, or variation thereof.

The system 100 may include a host system 102, switching fabric 140 (including one or more switches not shown) and data storage system 120. The host system 102 and data storage system 120 may communicate over one or more I/O paths through the switching fabric 140. Elements 110*a*-110*c* denote connections between the host system 102 and switching fabric 140. Element 112*a*-112*c* denote connections between the data storage system 120 and the switching fabric 140. Thus, switching fabric 140 may more generally considered a network providing the connectivity between the host system 102 and data storage system 120. The element 130 may represent a physical storage device of the data storage system 120, such as a rotating disk drive, flash-based or other solid state storage device, or the like, where the physical storage physical storage device 130 may be configured to include three LSUs—LUN5, LUN6 and LUN10. It should be noted that in the illustrative embodiment of FIG. 5, the system 100 includes only a single host system 102, single physical storage device 130 with 3 LSUs, and a single data storage system 120 for purposes of simplicity to illustrate the techniques herein. For example, each of the LSUs may be configured to have storage provisioned from multiple different physical storage devices rather than a single physical storage device, and multiple host systems having multiple applications executing thereon may communicate with the data storage system.

The host system 102 may be implemented as a server, and may include an application 104, a multi-path (MP) driver 106 and other components 108 such as, for example, one or more other device drivers and other code. An I/O request (specifying an I/O operation) from the application 104 may be communicated to the data storage system 120 using the MP driver 106 and one or more other components 108. The application 104 may be a database or other application which issues data operations, such as I/O operations, to the data storage system 120. Each of the I/O operations may be directed to a target device, such as one of the LSUs of physical storage device 130, configured to be accessible to the host system 102 over multiple I/O paths. As such, each of the I/O operations may be forwarded from the application 104 to the data storage system 120 over one of the possible multiple I/O paths.

The MP driver 106 may include functionality to perform any one or more different types of processing such as related to encryption, multi-pathing, mirroring, migration, and the like. For example, the MP driver 106 may include multi-pathing functionality for management and use of multiple I/O paths. For example, the MP driver 106 may perform I/O path selection to select one of the possible multiple I/O paths based on one or more criteria such as load balancing to distribute I/O requests for the target device across available active I/O paths. Load balancing may be performed to provide for better resource utilization and increased performance of the host system, data storage system, and network or other connection infrastructure. The MP driver 106 may be included in a commercially available product such as, for example, Dell EMC PowerPath® software made available by Dell EMC. Other components 108 of the host system 102 may include one or more other layers of software used in connection with communicating the I/O operation from the host system to the data storage system 120 such as, for example, Fibre Channel (FC) or SCSI drivers, a logical volume manager (LVM), or the like. The other components 108 may include software or other components used when sending an I/O operation from the application 104 to the data storage system 120, where such components may include those invoked in a call stack above and/or below the MP driver 106. For example, application 104 may issue an I/O operation which is communicated via a call stack including an LVM, the MP driver 106, and an FC or SCSI driver, e.g., as described elsewhere herein in more detail.

The data storage system 120 may include one or more physical storage devices, such as physical storage device 130, where each such physical storage device may be configured to store data of one or more LSUs. Each of the LSUs having data stored on the physical storage device 130 may be configured to be accessible to the host system 102 through one or more I/O paths. For example, all LSUs of physical storage device 130 may be accessible using ports of the three FAs 122*a*-122*c*, also denoted respectively as host adapters FA1, FA2 and FA3. The multiple I/O paths allow the application I/Os to be routed over multiple I/O paths and, more generally, allow the LSUs of physical storage device 130 to be accessed over multiple I/O paths. In the event that there is a component failure in one of the multiple I/O paths, I/O requests from applications can be routed over other alternate I/O paths unaffected by the component failure. The MP driver 106 may be configured to perform load balancing in connection with I/O path selection, as well as other processing. The MP driver 106 may be aware of, and may monitor, all I/O paths between the host system and the LSUs of the physical storage device 130 in order to determine which of the multiple I/O paths are active or available at a point in time, which of the multiple I/O paths are unavailable for communications, and to use such information to select an I/O path for host system-data storage system communications.

In the example of the system 100, each of the LSUs of the physical storage device 130 may be configured to be accessible through three I/O paths. Each I/O path may be represented by two path endpoints having a first endpoint on the host system 102 and a second endpoint on the data storage system 120. The first endpoint may correspond to a port of a host system component, such as a host bus adapter (HBA) of the host system 102, and the second endpoint may correspond to a port of a data storage system component, such as a port of an FA of the data storage system 120. In the example of the system 100, elements A1, A2 and A3 each denote a port of a host system 102 (e.g., a port of an HBA), and elements B1, B2 and B3 each denote a port of an FA of the data storage system 120. Each of the LSUs of the physical storage device 130 may be accessible over three I/O paths—a first I/O path represented by A1-B1, a second I/O path represented by A2-B2 and a third I/O path represented by A3-B3.

FIG. 6 is a block diagram illustrating an example of a plurality of logical layers 150 of a combination of a host system (e.g., the host system 102 of FIG. 3) and a data storage system (e.g., the data storage system 120) for processing an I/O request, according to embodiments of the invention. Other embodiments of a plurality of logical layers of a combination of a host system and a data storage system for processing an I/O request, for example, variations of logical layers 150, are possible and are intended to fall within the scope of the invention.

FIG. 6 provides further detail regarding various software layers that may be used in connection with the MP driver 106 of FIG. 5. The various software layers of 150 may generally form layers included in the runtime I/O stack, such as when an I/O request is issued by an application on a host system to a data storage system. The system includes an application layer 121 which includes application programs executing on the host system computer 102. The application layer 121 may refer to storage locations using an associated label or identifier such as a file name or file identifier. Below the application layer 121 is the file system layer 123 and the LVM layer 125a that maps the label or identifier specified by the application layer 121 to an LSU which the host system may perceive as corresponding to a physical storage device address (e.g., the address of one of the disk drives) within the storage system. Below the LVM layer 125a may be the MP (multi-path) driver 106 which handles processing of the I/O received from layer 125a. The MP driver 106 may include a base driver and one or more driver extension modules. The MP driver 106 may be implemented using a commercially available product such as Dell EMC PowerPath software.

Functionality for performing multi-pathing operations, such as may be performed by Dell EMC PowerPath software, may be included in one of the driver extension modules such as a multi-path extension module. As described above, the MP driver may perform processing in connection with multiple I/O path management and selecting one of a plurality of possible I/O paths for use in connection with processing I/O operations and communicating with the data storage system, such as data storage system 120 of FIG. 5. More generally, one or more layers between the application layer 121 and the MP driver 106, for example, the file system 123, may provide for mapping an LSU (such as used in connection with block-based storage), presented by the data storage system to the host system, to another logical data storage entity, such as a file, that may be used by the application layer 121. Below the MP driver 106 may be the SCSI driver 125b and a hardware (HW) driver 125c. The SCSI driver 125b may handle processing of a received I/O request from the MP driver 106 such as related to forming a request in accordance with one or more SCSI standards. The driver 125c may be a hardware driver that facilitates communication with hardware on the host system. The driver 125c may be, for example, a driver for an HBA of the host system which sends commands or requests to the data storage system and also receives responses and other communications from the data storage system. It should be appreciated that, in some embodiments, the ordering of the MP driver 106 and SCSI driver 125b may be reversed. That is, in some cases, the MP driver 106 sits below the SCSI driver 126b.

In some embodiments, layers 121-125c are implemented on a host (e.g., the host system 102) coupled to a data storage system (e.g., the data storage system 120) that is an intelligent data storage system having its own mapping layer 127 such that the LSU known or exposed to the host system may not directly correspond to a physical storage device such as a disk drive. In such embodiments, the LSU specified by the host system in the I/O operation may be further mapped by the data storage system using its mapping layer 127. For example, an LSU specified by the host system may be mapped by the data storage system to one or more physical drives, and multiple LSUs may be located on a same physical storage device, multiple physical drives, and the like.

The MP driver 106, as well as other components illustrated in FIG. 6, may execute in a kernel mode or another privileged execution mode. In some embodiments using a Unix-based OS, the MP driver 106 may be executed in kernel mode, whereas an application such as represented by application layer 121 may typically execute in user mode, or more generally, a non-privileged execution mode. It should be appreciated that embodiments of the invention may be implemented using any of a variety of different suitable OSs including a Unix-based OS, a Linux-based system, any one of the Microsoft Windows® OSs, or other OSs. Additionally, the host system may provide a virtualized environment and may execute, for example, VMware ESX® or VMware ESXi™ software providing bare-metal embedded hypervisors.

In operation, an application executing at application layer 121 may issue one or more I/O requests specifying I/O operations (e.g., read and write operations) to logical volumes (implemented by the LVM 125a) or files (implemented using the file system 123), whereby such I/O requests may be mapped to I/O communications (specifying the I/O operation) directed to LSUs of the data storage system. Such I/O operations from the application layer 121 may be directed to the MP driver 106 after passing through any intervening layers such as, for example, the layers 123 and 125a. Communications between an initiator port of the host system and a target port of a data storage system (e.g., target port of an FA) may include those related to I/O operations and other non-IO commands such as related to host system control operations. I/O operations may include, for example, read and write operations with respect to data stored on an LSU.

In connection with the SCSI standard, an I/O path may be defined between an initiator port of the host system and a target port of the data storage system. An I/O request may be sent from the host system (e.g., from a component thereof such as an HBA), which may be referred to as an initiator, originator or source with respect to the foregoing I/O path. The host system, as the initiator, sends I/O requests along the I/O path to a data storage system (e.g., a particular component thereof such as an FA having a port with a network address), which may be referred to as a target, destination, receiver, or responder. Each physical connection of an I/O path may be between a first endpoint which is a port of the host system (e.g., such as an HBA having ports such as denoted as A1-A3 of FIG. 5) and a second endpoint which is a port of an FA (e.g., such as B1-B3 of FIG. 5) in the data storage system. Through each such I/O path, one or more LSUs may be visible or exposed to the host system initiator through the target port of the data storage system.

In some embodiments of a storage network, data specified in different time standards from different storage network components are temporally correlated, for example, in relation to investigating a phenomenon on the storage network.

Figure 7:
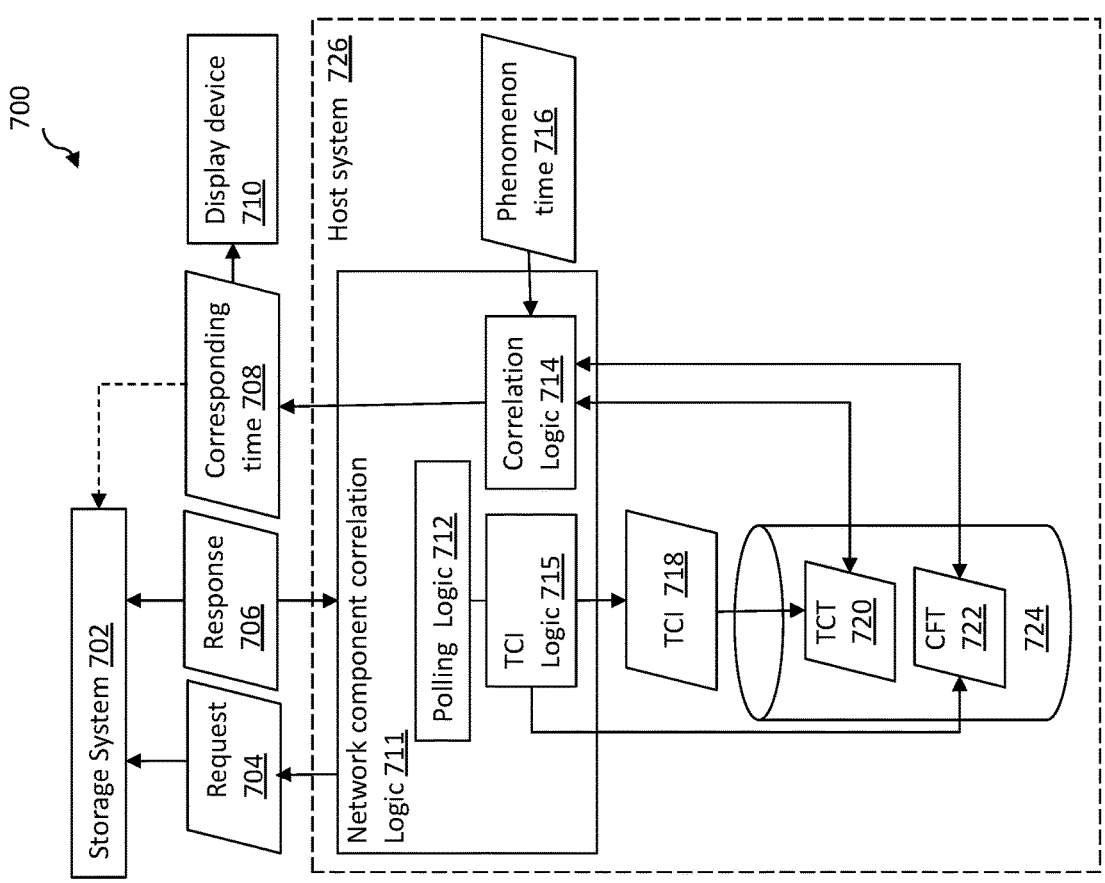
FIG. 7 is a block diagram illustrating an example of a system for correlating a time on a first network component to a time on a second network component, according to embodiments of the invention.

FIG. 7 is a block diagram illustrating an example of a system 700 for correlating a time on a first network component to a time on a second network component, according to embodiments of the invention. Other embodiments of a system for correlating a time on a first network component to a time on a second network component, for example, variations of the system 700, are possible and are intended to fall within the scope of the invention. The system 700 may be implemented as part of the storage network 10 or the system 100. For example, at least a part of the system 700 may be implemented as part of the host system 102, e.g., as part of the MP driver 106 in particular.

The system 700 may include any of: a storage system 702 (e.g., 20a-n, 120); network component correlation logic 711; data storage 724; display device 710; other components; or any suitable combination of the foregoing. The network component correlation logic 711 and data storage 724 may be part of a host system 726 (e.g., 102), and the network component correlation logic 711 may be implemented by an MP driver (e.g., 106). The network component correlation logic 711 may include polling logic 712, correlation logic 714 and TCI logic 715.

The polling logic 712 may be configured to control sending polling requests 704 to the storage system 702, to receive responses 706 including the CST of the storage system 702, and to determine the CHT of the host system to pair with the CST. The polling logic 712 may be configured to provide the CST/CHT pair to the TCI logic 715.

The TCI logic 715 may be configured to generate additional TCI beyond the CST/CHT pair, for example, information described in more detail elsewhere herein. For example, the TCI may include a conversion function for converting the CHT in the time standard of the host to the CST in the time standard of other network components, including that of the storage system, and vice versa. The TCI logic 715 may be configured to store TCI 718 for the CST/HST pair in a TCT 720 in the data storage 724. The polling logic 712 and the TCI logic 715 may collectively perform a method 1000 described in relation to FIG. 10.

Figure 8:
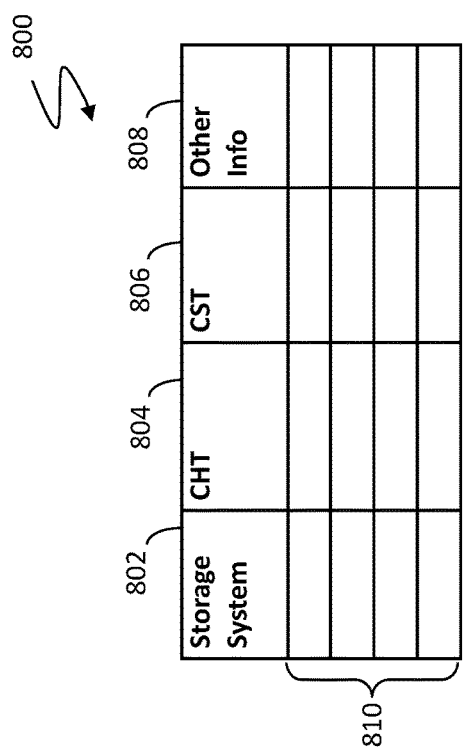
FIG. 8 is a block diagram illustrating an example of a data structure correlating times on a first network component to times on a second network component, according to embodiments of the invention.

The TCT 720 may be implemented as data structure 800 described in relation to FIG. 8. FIG. 8 is a block diagram illustrating an example of the data structure 800 correlating times on a first network component to times on a second network component, according to embodiments of the invention. Other embodiments of a data structure correlating times on a first network component to times on a second network component, for example, variations of the data structure 800, are possible and are intended to fall within the scope of the invention. The data structure 800 may be referred to herein as the TCT 800.

The TCT 800 may include a plurality of entries 810, each entry corresponding to a CST/CHT pair and specifying TCI for the CST/CHT pair. Each entry may specify: a CHT in a CHT column 804; a CST is a CST column 806; and other TCI for the CST/CHT pair in one or more other information columns 808. The other TCI may include any of the TCI described herein.

Figure 9:
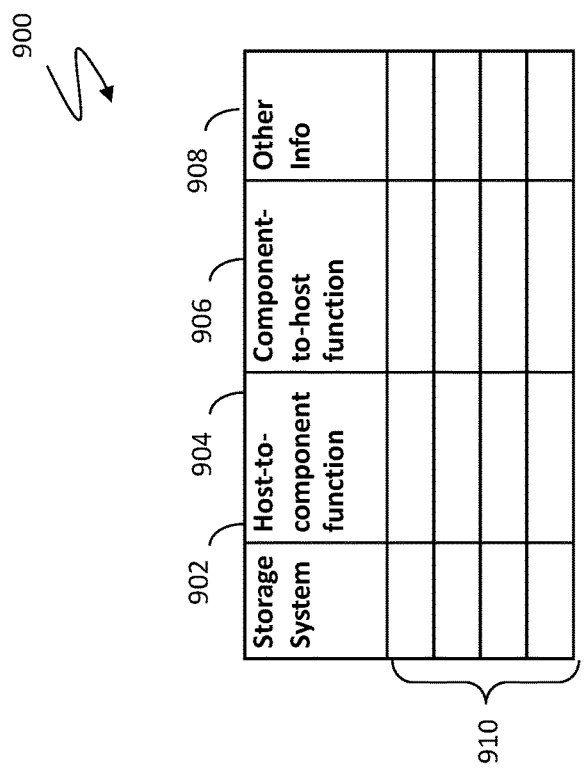
FIG. 9 is a block diagram illustrating an example of a data structure defining time conversion functions between network components, according to embodiments of the invention.

Returning to FIG. 7, in some embodiments, the TCI logic 715 also may be configured to store the conversion functions between the host system's standard time and the storage system's standard time in a conversion function table 722 in the data storage 724, for example, data structure 900 described in relation to FIG. 9.

FIG. 9 is a block diagram illustrating an example of the data structure 900 defining time conversion functions between network components, according to embodiments of the invention. Other embodiments of a data structure 900 defining time conversion functions between network components, for example, variations of the data structure 900, are possible and are intended to fall within the scope of the invention. The data structure 900 may be referred to herein as CFT 900.

The CFT 900 may include a plurality of entries 910, each entry representing a host-network component (e.g., storage system) combination. Each entry may specify any of: a host-to-network component conversion function in a column 904 for converting a time standard of the host to a time standard of the network component represented by the entry; a network component-to-host conversion function in a column 906 for converting a time standard of the network component represented by the entry to a time standard of the host; and other information relating to the conversion in a column 908.

Figure 11:
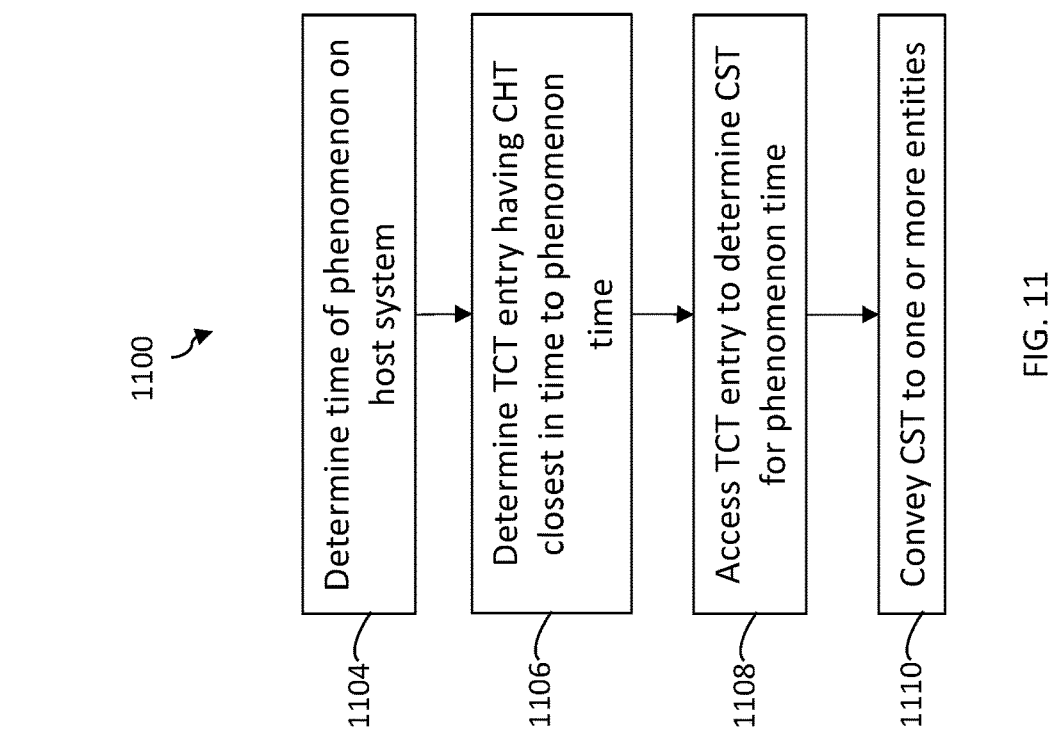
FIG. 11 is a flow chart illustrating an example of a method of correlating a time of a phenomenon between network components, according to embodiments of the invention.

Returning to FIG. 7, the correlation logic 714 may be configured to correlate a time of a phenomenon between network components, for example, as described in more detail elsewhere herein, e.g., by implementing a method 1100 described in relation to FIG. 11. The correlation logic 714 may be configured to receive a time 716 associated with a phenomenon, for example, the time an error occurred on the host system, which may been recorded in a var/log/messages directory on the host system. The correlation logic 714 may access the TCT 720 to determine an entry representing a CHT that is closest to the phenomenon time from among the CHTs listed in the entries. The correlation logic 714 may be configured to convey the CST of the determined entry, for example, to a user via a display device 710 (e.g., a monitor of a computer or smart phone) and/or to another network component, e.g., the storage system 702.

In some embodiments, in response to receiving the phenomenon time 716, rather than accessing the TCT 720, the correlation logic 714 may be configured to access the entry in the CFT 722 corresponding to the network component in question—i.e., a network component corresponding to the phenomenon. The correlation logic 714 may be configured to apply the host-to-component conversion to covert the phenomenon time from the host system's time standard to the time standard of the network component (e.g., storage system 702), and may control conveying the converted time to one or more other entities.

Figure 10:
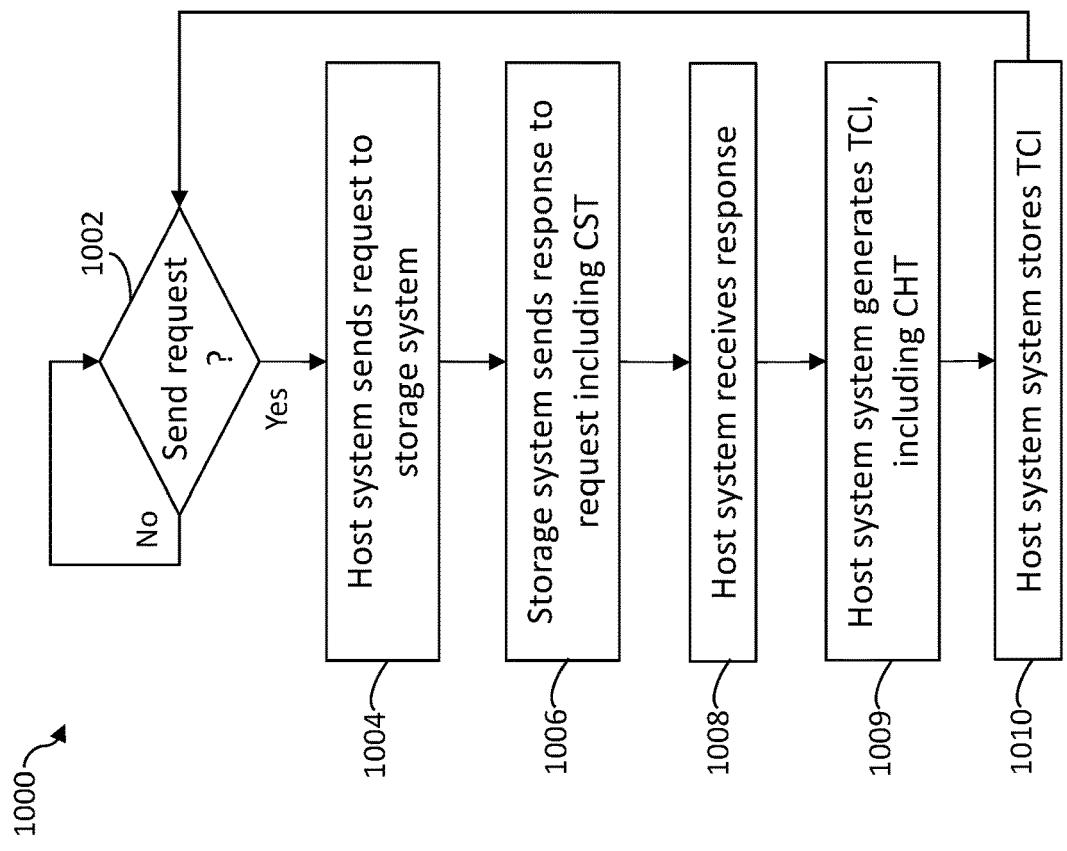
FIG. 10 is a flow chart illustrating an example of a method of generating information correlating time between network components, according to embodiments of the invention.

FIG. 10 is a flow chart illustrating an example of a method 1000 of generating information correlating time between network components, according to embodiments of the invention. Other embodiments of a method of generating information correlating time between network components, for example, variations of the method 1000, are possible and are intended to fall within the scope of the invention. The method 1000 shall be described in relation to a host system and a storage system, but it should be appreciated that the invention is not so limited and may be applied between any two network components of a storage network or other type of network. The method 1000 may be performed by an MP driver (e.g., the MP driver 106) of a host system.

In a step 1002, it may be determined whether it is time to send a next request from a host system to a storage system, for example, according to predefined schedule, e.g., every N milliseconds or seconds. The request may be for the current time on the storage system according to the time standard of the storage system. If it is not such a time, the step 1002 may be repeated until it is such time. If it is determined that it is time to send a request, then the host may send the request to the storage system in a step 1002.

The storage system may determine the CST on the storage system and, in a step 1006, send a response to the request including the CST. The host system may receive the response in a step 1008. The steps 1002, 1004 and 1008 may be performed by the polling logic 712.

In a step 1009, the host system may generate a CHT for the CST and generate other TCI for the CST/CHT pair, for example, as described in more detail elsewhere herein. In some embodiments, the host system may generate or update a conversion functions for converting time between the time standards of the host system and the storage system based on the CST/CHT pair or TCI generated therefrom.

In a step 1010, the host system may store the TCI for the CST/CHT pair, for example, in the TCT 720 of the data storage 724. The steps 708 and 710 may be performed by the TCI logic 715. In some embodiments, a conversion function between the host system may be stored, for example, in the CFT 722 by the TCI logic 715.

FIG. 11 is a flow chart illustrating an example of a method 1100 of correlating a time of a phenomenon between network components, according to embodiments of the invention. Other embodiments of a method of correlating a time of a phenomenon between network components, for example, variations of the method 1100, are possible and are intended to fall within the scope of the invention. The method 1100 shall be described in relation to a host system and a storage system, but it should be appreciated that the invention is not so limited and may be applied between any two network components of a storage network or other type of network. The method 1000 may be performed by an MP driver (e.g., the MP driver 106) of a host system, for example, by the correlation logic 714.

In a step 1104, the time of a phenomenon may be determined and/or or received, for example, from another entity (e.g., via user input). The time may be specified in the standard time of the host system. In a step 1106, it may be determined which TCT entry (e.g., of the TCT 720) specifies a CHT closest in time to the time of the phenomenon from among the CHTs specified by the entries. The contents of the determined entry may be accessed in a step 1108 to determine the CST to be considered the time in the time standard of the storage system corresponding to the time of the phenomenon.

In some embodiments, the phenomenon time may be specified in the time standard of another network component, e.g., in which case the TCT entry having the closest time expressed in the time standard of the other network may be determined. For example, if the time of the phenomenon is expressed in the time of the storage system, the step 1106 may include determining and accessing the TCT entry specifying a CST closest in time to the time of the phenomenon, and the CHT of the entry may be considered the time in the time standard of the host system corresponding to the time of the phenomenon.

In some embodiments, rather than accessing the TCT, the entry of the CFT representing time conversion between the host system and storage system may be accessed, and a conversion function stored therein applied to convert host system time to storage system time or vice versa.

In a step 1110, the CST determined to correspond (i.e., correlate) to the time of the phenomenon may be reported to one or more entities, for example, an administrator of the storage system. In some embodiments, the CST may be used, for example, in conjunction with a corresponding CHT, by the storage system administrator, the host administrator or other persons to determine the source of a performance issue, error or failure on a storage network.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 1000 and 1100, or parts thereof, may be implemented using one or more of the systems and/or data structures described in relation to FIGS. 1-9 or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, or any suitable combination thereof.

Software implementations of embodiments of the invention may include executable code that is stored on one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a storage network including a first component and a second component, a method comprising:
    sending a request from the second component to the first component to provide a current time on the first component, wherein the first and second components are physical components in the storage network;
    receiving a response to the request, the response specifying a first time when the response was sent according to a first time standard of the first component;
    determining a second time when the response was received according to a second time standard of the second component;
    storing, on the second component, first information associating the first time and the second time, wherein the first information is stored in a first entry of a plurality of entries of a data structure, wherein each of the plurality of entries includes a representation of a pair of times comprising one time of the first component and a corresponding time of the second component, wherein the first entry includes a representation of the second time according to the second time standard of the second component; and for a phenomenon involving the first component, determining, based on the first information, a third time that the phenomenon occurred according to the first time standard, wherein said determining the third time includes:
- receiving an indication regarding an occurrence of the phenomenon at a fourth time according to the second time standard of the second component;
- determining that the first entry, from among the plurality of entries, identifies a closest time to the fourth time; and
- determining the third time of the phenomenon according to the first time standard based on the first information of the first entry.

2. The method of claim 1, wherein the first information is stored in a directory on the second component on which phenomena that occur on the storage network, including the phenomenon, are logged.

3. The method of claim 1, further comprising:
generating the first information between the first time and the second time, wherein the first information includes information about the first time standard and the second time standard.

4. The method of claim 3, wherein the first time standard is for a first time zone, and the second time standard is for a second time zone, and wherein the first information includes information about the first time zone and the second time zone.

5. The method of claim 1, wherein the first time standard has a first format, and the second time standard has a second format, the method further comprising:
generating the first information, including performing at least one of: converting the first time to another format, and converting the second time to another format.

6. The method of claim 1, wherein sending the request, receiving the response specifying the first time, determining the second time, and storing the first information are repeated a plurality of times over a period of time to produce a plurality of information elements over the period of time, including the first information, and wherein the plurality of information elements are stored in the data structure including the plurality of entries, each entry specifying one of the plurality of information elements.

7. The method of claim 1, wherein the first component is a storage system and the second component is a host system.

8. The method of claim 1, wherein said determining that the first entry represents the closest time to the fourth time further comprises:
determining that the second time, from among all the corresponding times of the plurality of entries, is closest in time to the fourth time.

9. For a storage network including a first component and a second component, a system comprising:
one or more processors; and
a memory comprising code stored thereon that, when executed, performs a method comprising:
- sending a request from the second component to the first component to provide a current time on the first component, wherein the first and second components are physical components in the storage network;
- receiving a response to the request, the response specifying a first time when the response was sent according to a first time standard of the first component;
- determining a second time when the response was received according to a second time standard of the second component;
- storing, on the second component, first information associating the first time and the second time, wherein the first information is stored in a first entry of a plurality of entries of a data structure, wherein each of the plurality of entries includes a representation of a pair of times comprising one time of the first component and a corresponding time of the second component, wherein the first entry includes a representation of the second time according to the second time standard of the second component; and
- for a phenomenon involving the first component, determining, based on the first information, a third time that the phenomenon occurred according to the first time standard, wherein said determining the third time includes:
  - receiving an indication regarding an occurrence of the phenomenon at a fourth time according to the second time standard of the second component;
  - determining that the first entry, from among the plurality of entries, identifies a closest time to the fourth time; and
  - determining the third time of the phenomenon according to the first time standard based on the first information of the first entry.

10. The system of claim 9, wherein the first information is stored in a directory on the second component on which phenomena that occur on the storage network, including the phenomenon, are logged.

11. The system of claim 9, wherein the method further includes:
generating the first information between the first time and the second time, wherein the first information includes information about the first time standard and the second time standard.

12. The system of claim 11, wherein the first time standard is for a first time zone, and the second time standard is for a second time zone, and wherein the first information includes information about the first time zone and the second time zone.

13. The system of claim 9, wherein sending the request, receiving the response specifying the first time, determining the second time, and storing the first information are repeated a plurality of times over a period of time to produce a plurality of information elements over the period of time, including the first information, and wherein the plurality of information elements are stored in the data structure including the plurality of entries, each entry specifying one of the plurality of information elements.

14. For a storage network including a first component and a second component, one or more non-transitory computer-readable media having software stored thereon comprising:
- executable code that controls sending a request from the second component to the first component to provide a current time on the first component, wherein the first and second components are physical components in the storage network;
- executable code that controls receiving a response to the request, the response specifying a first time when the response was sent according to a first time standard of the first component;
- executable code that controls determining a second time when the response was received according to a second time standard of the second component;

executable code that controls storing, on the second component, first information between the first time and the second time on the second component, wherein the first information is stored in a first entry of a plurality of entries of a data structure, wherein each of the plurality of entries includes a representation of a pair of times comprising one time of the first component and a corresponding time of the second component, wherein the first entry includes a representation of the second time according to the second time standard of the second component; and executable code that, for a phenomenon corresponding to the first component, controls determining a third time of the phenomenon according to the first time standard based on the first information between the first time and the second time, wherein said determining the third time includes:
   receiving an indication regarding an occurrence of the phenomenon at a fourth time according to the second time standard of the second component;
   determining that the first entry, from among the plurality of entries, identifies a closest time to the fourth time; and
   determining the third time of the phenomenon according to the first time standard based on the first information of the first entry.

15. The non-transitory one or more computer-readable media of claim 14, wherein the first information is stored in a directory on the second component on which phenomena that occur on the storage network, including the phenomenon, are logged.

16. The non-transitory one or more computer-readable media of claim 14, further comprising:
   executable code that controls generating the first information between the first time and the second time, wherein the first information includes information about the first time standard and the second time standard.

17. The non-transitory one or more computer-readable media of claim 16, wherein the first time standard is for a first time zone, and the second time standard is for a second time zone, and wherein the first information includes information about the first time zone and the second time zone.

18. The non-transitory one or more computer-readable media of claim 14, wherein sending the request, receiving the response specifying the first time, determining the second time, and storing the first information are repeated a plurality of times over a period of time to produce a plurality of information elements over the period of time, including the first information, and wherein the plurality of information elements are stored in the data structure including the plurality of entries, each entry specifying one of the plurality of information elements.

* * * * *